United States Patent

Heizmann

[11] Patent Number: 5,567,032
[45] Date of Patent: Oct. 22, 1996

[54] ILLUMINATING DEVICE FOR VEHICLES

[75] Inventor: Frieder Heizmann, Denens, Switzerland

[73] Assignee: Robert Bosch GmbH, Stuttgart, Germany

[21] Appl. No.: 340,223

[22] Filed: Nov. 16, 1994

[30] Foreign Application Priority Data

Dec. 3, 1993 [DE] Germany ............... 43 41 234.3

[51] Int. Cl.$^6$ ............................................. B60Q 1/12
[52] U.S. Cl. ........................... 362/37; 362/32; 362/41; 362/43; 362/71; 362/276; 362/277; 362/802
[58] Field of Search ................. 362/32, 37, 39, 362/41, 43, 44, 66, 71, 276, 802, 284, 324, 420, 425, 277, 319; 315/81–83

[56] References Cited

U.S. PATENT DOCUMENTS

| | | | |
|---|---|---|---|
| 1,948,264 | 2/1934 | Hoag | 362/44 |
| 1,974,371 | 9/1934 | Tamussino | 362/41 |
| 4,758,930 | 7/1988 | Pomares | 362/32 |
| 4,768,135 | 8/1988 | Kretschmer et al. | 362/71 |
| 4,870,545 | 9/1989 | Hatanaka et al. | 315/82 |
| 4,908,560 | 3/1990 | Shibata et al. | 362/71 |

FOREIGN PATENT DOCUMENTS

| | | | |
|---|---|---|---|
| 4129955 | 11/1993 | Germany . | |
| 1438646 | 6/1976 | United Kingdom | 362/44 |

*Primary Examiner*—Denise L. Gromada
*Assistant Examiner*—Alan B. Cariaso
*Attorney, Agent, or Firm*—Michael J. Striker

[57] ABSTRACT

An illuminating device for a vehicle has at least one light generating unit, at least one light distributing unit, at least one light conducting element connecting the units with one another, the light distributing unit being provided with at least one lens element for projecting and distributing light exiting from an end of the light conducting element associated with light distributing element, the units and the element being arranged so that a relative arrangement between the end of the light element associated with the light distributing element and also the lens element is changeable in a substantially horizontal direction for changing a distribution of light exiting the light conducting elements, and an adjusting device provided for changing the arrangement and activated by steering of the vehicle so that an illumination provided by the light distributing unit is increased in an actual driving direction.

14 Claims, 4 Drawing Sheets

ILLUMINATING DEVICE FOR VEHICLES

BACKGROUND OF THE INVENTION

The present invention relates to an illuminating device for vehicles.

One of such illuminating devices is disclosed for example in the German document DE-A1 41 29 955. This illuminating device has a light generating unit and a plurality of light distributing units connected with the light generating unit through light conductive elements. Each light distributing unit has several light distributing subunits each provided with a lens element associated with a light conductive element and utilized for projection and distribution of the light exiting the associated light element. The light exiting the light distributing unit illuminates in the traffic situation an area in front of the vehicle, wherein the distribution of the light is determined by the arrangement of the lens element and the light distributing element as well as the construction of the lens element. The light distributing elements and the lens elements are arranged at a definite position and not movable so that the distribution of light exiting the light distributing units cannot be changed. The distribution of the light is selected so that the traffic situation is well illuminated for the straight drive of the vehicle. This however means that during driving of the vehicle over the curve, the illumination of the traffic situation is optimal since the illumination of the traveling direction is not sufficient and a blinding of the oppositely driving vehicle driver is possible. Also, during turning the traffic space in which the vehicle moves is not sufficiently illuminated, so that eventually available obstacle can not be recognized by a vehicle driver.

SUMMARY OF THE INVENTION

Accordingly, it is an object of the present invention to provide an illuminating device for vehicles, which avoids the disadvantages of the prior art.

In keeping with these objects and with others which will become apparent hereinafter, one feature of the present invention resides, briefly stated, in an illuminating device for vehicles in which the relative association between the end of the light conductive element associated with the light distributing unit and the lens element is changeable for changing the distribution of light exiting the light conductor element in approximately horizontal direction by an adjusting device, and the adjusting device during driving of the vehicle is activated so that the illumination provided by the light distributing element is increased in the driving direction.

When the illuminating device for a vehicle is designed in accordance with the present invention, it has the advantage that the illumination of the traffic situation in the actual driving direction is sufficient only during travel over a curve. The distribution of the light exiting the light distributing unit can be actuated by a movement only of the light conducting element, only the lens element or both parts.

In accordance with another feature of the present invention, the light distributing unit has several light distributing subunits each having a lens element and an associated light conducting element, and the change of the association between the light conducting element and the lens element is performed with different intensity in different light distributing subunits. With this construction the light exiting the light distributing unit can be changed in a desired manner.

In accordance with still another feature of the present invention, the adjusting device during the actuation of the travel direction indicator of the vehicle, can be activated so that the illumination provided by the light distributing unit is increased in the traveling direction identified by the travel direction indicator. With this construction during turning the traffic area in which the vehicle must travel and its direction identified by the actuation of the corresponding travel direction indicator, is sufficiently illuminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
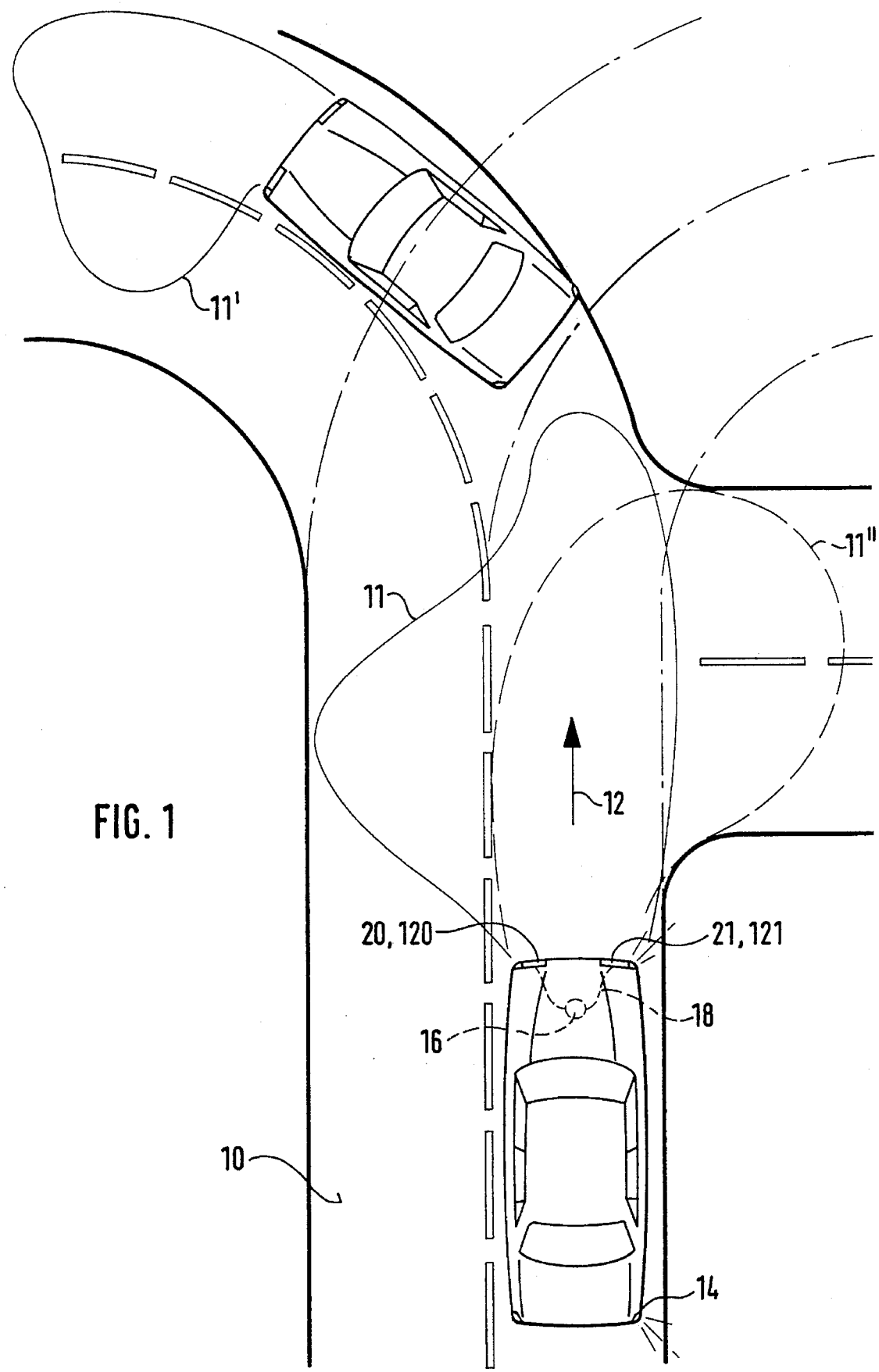
FIG. 1 is a view showing a vehicle with an illuminating device in accordance with the present invention as well as a roadway in front of the vehicle, in a simplified showing on a plan view.

A motor vehicle shown in FIG. 1 has an illuminating device which is used for illuminating a traffic situation in front of the vehicle, in other words a roadway 10 and edge regions near the roadway 10 as well as obstacles located there. The roadway 10 shown in FIG. 1 has, as considered in front of the motor vehicle in a traveling direction 12, a left curve identified by a solid line and a right curve identified with a broken line. Moreover, a turn to the right in front of the vehicle is illustrated. The motor vehicle in addition to the illuminating device also has driving direction indicators 14 arranged in a known manner in corner regions of the chassis and actuated with a lever by a vehicle driver.

Figure 2:
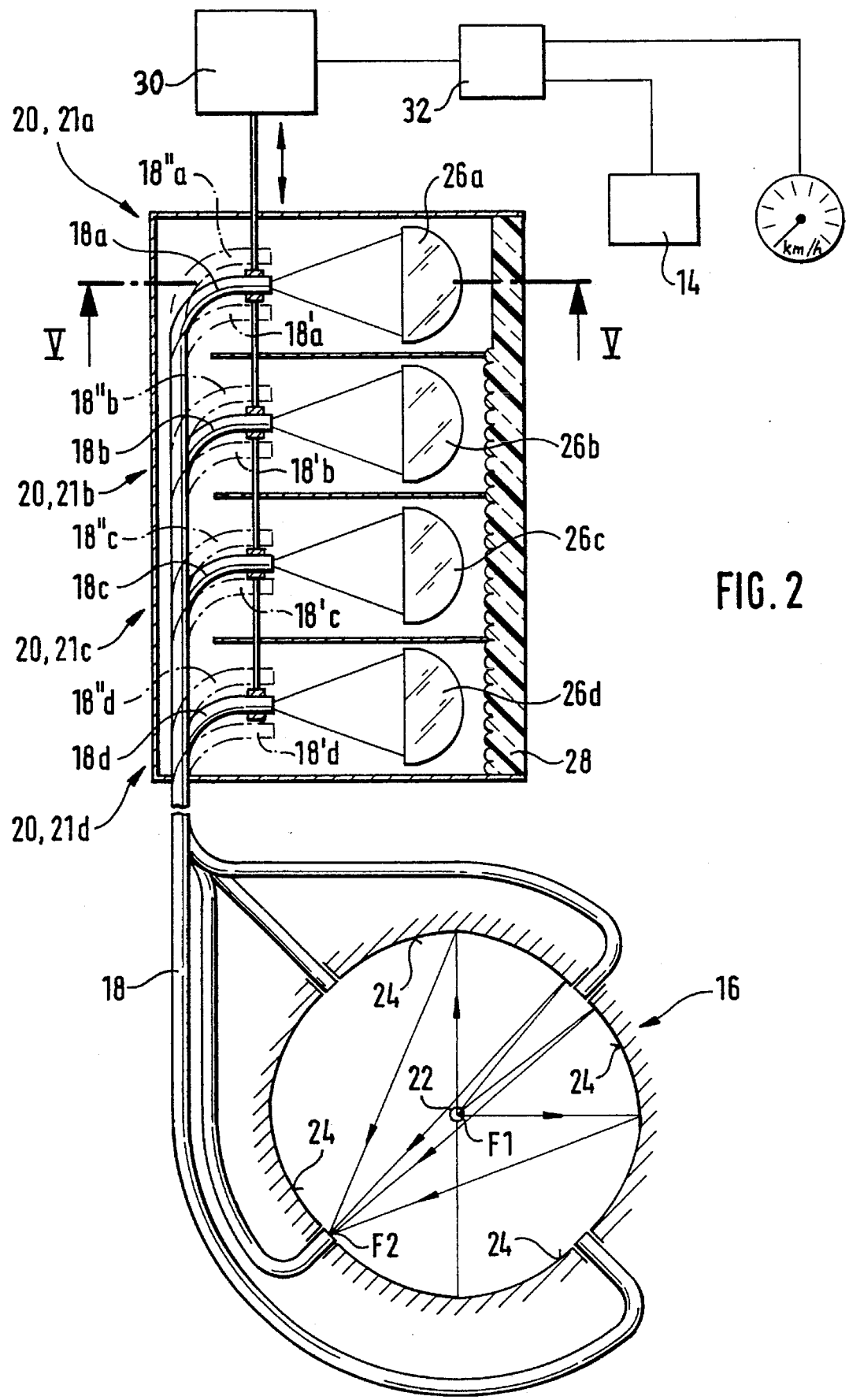
FIG. 2 is a view showing the inventive illuminating device of the vehicle on an enlarged scale in accordance with a first embodiment of the invention.
Figure 3:
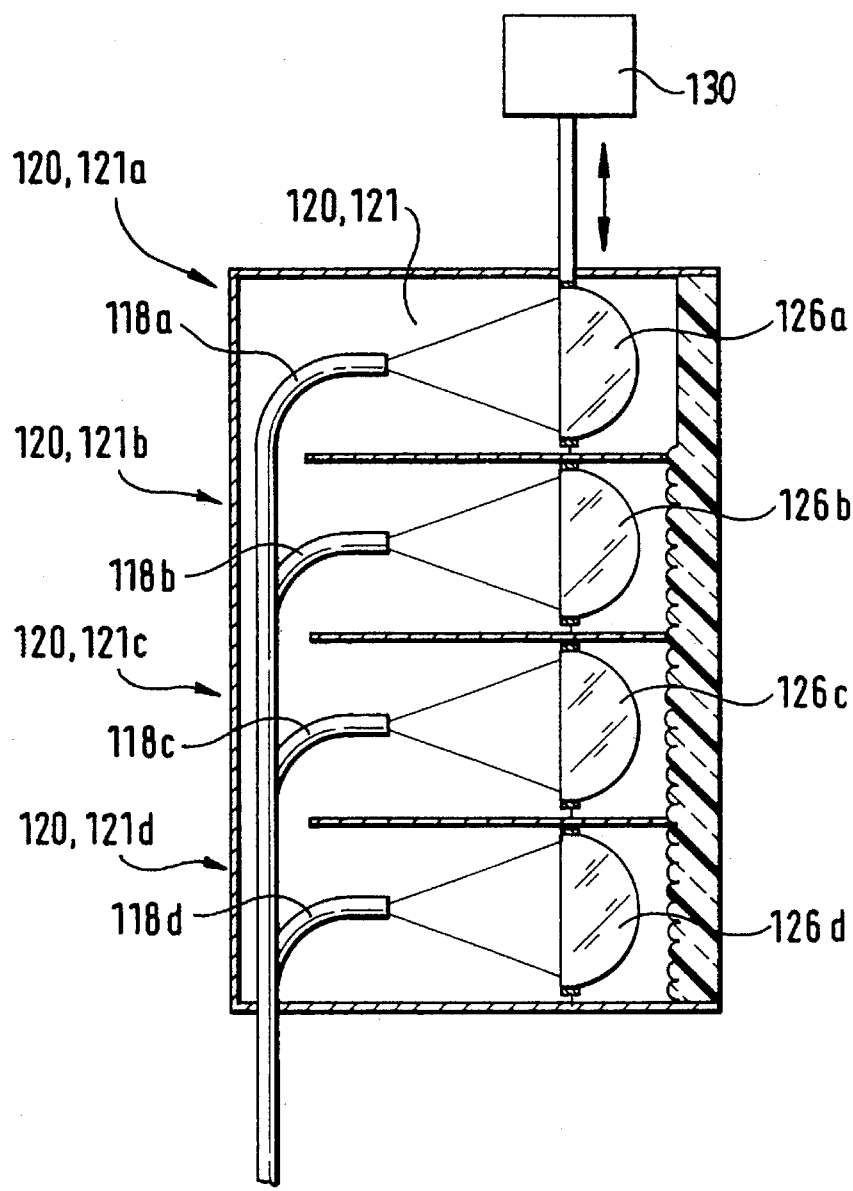
FIG. 3 is a view showing the inventive illuminating device in accordance with a second embodiment of the invention.

The illuminating device is shown in FIGS. 2 and 3 and has a light generating unit 16 and two light distributing units 20, 21 connected with it through light conducting elements 18. The light distributing units 20, 21 are arranged as conventional headlights at the vehicle edges on the front end of the chassis of the motor vehicle. The light distributing unit 20 is arranged so that it faces a counter traffic side or in the shown embodiment for the right traffic at the left side, while the light distributing unit is arranged so that it faces a traffic side or in the shown embodiment is arranged at the right side. The light generating unit 16 is arranged in the vehicle independently from the light distributing units 20, 21 and connected with them through flexible light conducting elements 18. The light generating unit 16 has a light source 22 which can be formed as an incandescent lamp or a gas discharge lamp. The light source 22 is surrounded by a reflector 24 formed as a hollow body, from which the light conducting elements 18 extend. The reflector 24 is formed so that the light emitted by the light source 22 is supplied by the reflector with a maximum efficiency to the ends of the light conducting elements 18. The light conducting elements 18 are composed correspondingly of a plurality of light wave conductors, for example glass fibers. The reflector 24 is advantageously composed of several, for example four, identical parts which are parts of a rotation ellipsoid. The focal points F1 of the reflector parts 24 coincide with one another and the light source 22 is arranged there. In the corresponding second focal point F2 of the reflector parts 24, a corresponding end of a light conductive element 18 is arranged.

Each light distributing unit 20, 21 has several, in the shown embodiment four, light conductive subunits 20a–20d or 21a–21d. Each of the light conductive subunits has a lens element 26a–26d with which an end of a light conductive element 18a–18d is associated correspondingly, from which the light supplied from the light generating unit 16 exits. The lens elements 26 serve for projecting and distributing the light exiting the light conductive elements 18. For this purpose the lens elements 26a–26d can be formed so that they differently distribute the light exiting from the corresponding associated light conducting element 18a–18d. The light distributing unit 20, 21 also has a transparent cover plate 28 which can be formed as a smooth plate or can be provided with optically active elements for influencing the light coming the lens elements 26. Due to the superposition of the light beams coming from the individual lens elements 26, the light beam is produced which illuminates the traffic situation in front of the motor vehicle. When the illuminating device is operated in a low beam position, the light beam exiting the light distributing units 20, 21 has an upper bright-dark limit for avoiding blinding of the opposite traffic. The low beam in accordance with the regulations accepted in Europe has an asymmetrical bright-dark limit which is arranged at the counter traffic side substantially horizontally, and starting from it at the traffic side is arranged so that it raises to the outer edge of the traffic side, so that the extension width of the low beam at the traffic side is greater than at the counter traffic side.

For a straight travel of the vehicle, the light outlet ends of the light conducting elements 18 and the lens elements 26 are located with a certain association with one another, so that the light exiting the light conductive elements 18 is distributed in a manner required for forming the low beam. In the first embodiment shown in FIG. 2 an adjusting device 30 is provided which operates so that the light outlet-side ends of the light distributing elements 18 can be moved in a horizontal direction. The adjusting device 30 actuates a movement of the light conducting elements 18 in dependence on the steering of the motor vehicle and can be directly connected with steering parts of the vehicle or with a control device 32 which detects the steering operation and thereby controls the adjusting device 30. The adjusting device 30 moves the light conducting elements 18 so that the illumination of the traffic situation in front of the vehicle is increased in the actual driving direction or in other words during driving over a left curve the left side is illuminated more and during driving over a right curve the right side is illuminated more.

The light distributing elements 18 are shown in FIG. 2 in solid lines in their position for the straight driving. In a position of driving over a left curve the light conducting elements are shown in a broken line and identified with reference numeral 18', while in a position during driving over a right curve, the light conducting elements are also shown in a broken line and identified with reference numeral 18". The movement of the light conducting elements actuated by the adjusting device 30 can be performed continuously in accordance with the angle of steering in one step or in several steps. The adjusting device 30 can be formed as a drive element of an electric motor, and in some cases with a reducing transmission, a magnet or an electromagnet, a pneumatic or hydraulic device or another suitable device. The movement actuated by the adjusting device 30 must not be identical for all light conducting elements 18, but can be performed with different intensities. Moreover, it can be provided that not all light conductive elements 18 are moved but instead only a part of light conductive elements are moved while the remaining light conductive elements remain in their position for the straight driving.

In accordance with one embodiment of the illuminating device with the light distributing unit arranged so that it faces toward the counter traffic side, in the embodiment of the left light distributing unit 20, the light conductive elements 18 are movable from their position for the straight driving only to the outer edge of the traffic side or in other words to the right. With the light distributing unit 21 facing the traffic side in the embodiment of the right light distributing unit, the light conductive elements 18 are movable starting from their position for the straight driving only toward the counter traffic side, or in other words to the left. During driving over the curve directed toward the counter traffic side or in other words in the embodiment of a left curve, only the light conductive elements 18 of the light distributing unit 20 facing the counter traffic side are moved starting from their position for the straight driving toward the outer edge of the traffic side or in other words in the shown embodiment to the right. Therefore the light exiting this light distributing unit 20 illuminates well the roadway. The light conductive elements 18 of the other light distributing unit 21 remains during driving over this curve, in their position for straight driving. During driving over a curve which is directed toward the traffic side or in the shown embodiment to the right, only the light conductive elements 18 of the light distributing unit 21 which faces toward the traffic side are moved starting from their position for the straight driving toward the counter traffic side or in the shown embodiment to the left as illustrated in FIG. 1. Therefore a blinding of the opposite vehicle driver is avoided and the illumination of the traffic side is improved. Also, during driving over this curve the light conductive elements 18 of the other light distributing unit 20 remain in their position for the straight driving.

In accordance with a further feature of the illuminating device of the present invention, the control device 32 supplies additionally informations about the driving speed of the vehicle. Depending on the driving speed the light conductive elements 18 are moved by the adjusting device 30 differently strong or with different speed. It is for example advantageous when during higher driving speed of the vehicle, also the movement of the light guiding elements 18 is performed with a higher speed. Moreover, it is also possible during higher driving speed of the vehicle to move the light conductive elements 18 over a greater path to further increase the illumination of the actual driving direction.

The illuminating device can also be formed so that the control device 32 supplies information about an actuation of the driving direction indicator 14 of the vehicle. The control device 30 controls then the adjusting devices 30 and the light conductive elements are moved by them so that the illumination of the driving direction defined by the driving direction indicator 14 is increased, so that the traffic area is sufficiently illuminated in the actual driving direction. Preferably, during an actuation of the driving direction indicator 14, the light conductive elements 18 are moved by the adjusting device 30 starting from their definite first position for the straight driving, to a definite second position. As disclosed in the preceding paragraph, in this further embodiment of the illuminating device it is also possible to perform a movement of the light conductive elements 18 only with the light distributing units 20, 21 during the actuation of the driving direction indicator 14. For example it can be provided that only with the light distributing unit 20, 21 which is not arranged at the side to which the turn must be performed, a movement of the light conducting element 18 is performed to the side to which the turning must be performed. In particular it means that with the left light distributing element 20 during turning to the right, the light conducting elements 18 are displaced to the left, and in the right light distributing unit 21 during turning to the left, the light distributing elements 18 are displaced to the right. For the movement of the light distributing element 18 in dependence on the actuation of the driving direction indicator 14, it is also possible to provide an adjusting device which is independent from the adjusting device 30 which actuates the steering-dependent movement of the light conducting elements 18. Therefore in a simple manner during actuation of the driving direction indicator 14, another movement of the light conducting elements 18 can be performed than with the actuation from the steering.

FIG. 3 shows the second embodiment of the illuminating device in which it is formed substantially similar to the first embodiment. The parts of the illuminating device in accordance with the second embodiment which correspond to the parts of the illuminating device in accordance with the first embodiment are identified here with reference numerals which are increased by 100. The light conducting elements 118 which lead to the light distributing units 120, 121 are arranged stationarily. A change of the distribution of light exiting from the light distributing units 120, 121 in the second embodiment is performed by horizontal movement of the lens elements 126 from their position for their straight driving, by the adjusting device 130. In view of the projecting properties of the lens elements 126, they are displaced each in the opposite direction as described with respect to the light conducting elements 18 in the first embodiment. For providing a stronger illumination of the roadway 10 in front of the vehicle, the lens elements 126 must be displaced to the left and vice versa.

All possible further modifications of the illuminating device described in the first embodiment are utilizable for the second embodiment as well. The individual lens elements 126a–126d can be moved to a different extent by the adjusting device 130, or only a part of the lens elements 26a–26d can be moved, while the other part remains in the position for the straight driving. Depending on the steering direction, only the lens elements 126 of one light distributing unit 120, 121 can be moved. Moreover, the driving speed of the vehicle can be taken into consideration during the movement of the lens elements 126. Finally, also during an actuation of the driving direction indicator 14, a movement of the lens elements 126 can be performed.

It is to be understood that also a combination of the illuminating devices in accordance with the first and the second embodiments is possible. In such a combination both a movement of the light conducting elements 18, 118 and the lens elements 26, 126 is performed. It is also possible to provide a movement of the light conducting elements with one part of the light distributing subunits 20, 21a–21d or 120, 121a–121d, and provide a movement of the lens elements by another part.

Figure 4:
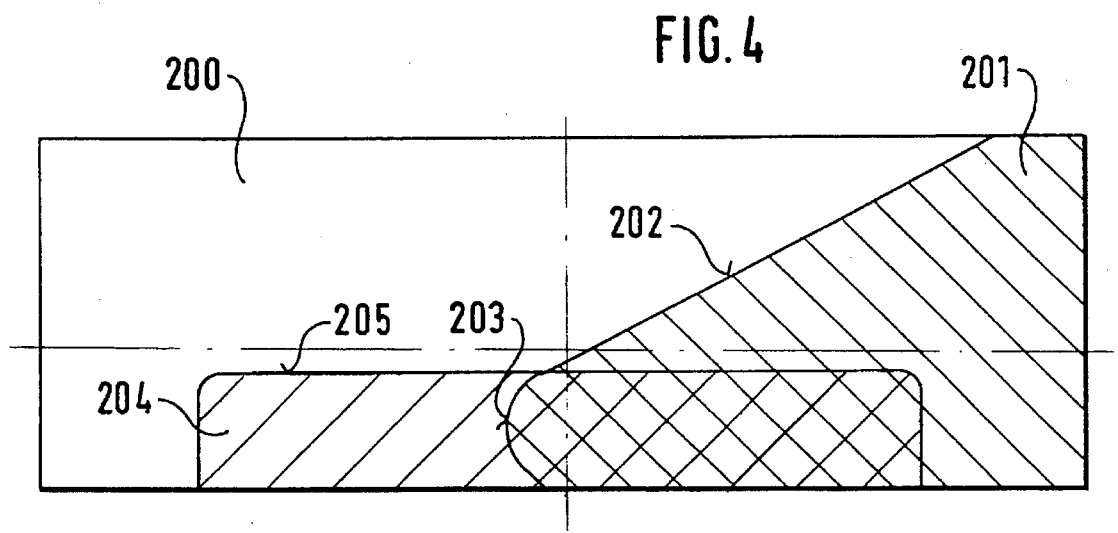
FIG. 4 is a view showing a measuring screen which is illuminated by the inventive device in accordance with a third embodiment of the invention.

The illuminating device in accordance with a third embodiment is formed substantially as described hereinabove. However, different light beams are emitted by the light distributing units 20, 21 or 120, 121 correspondingly. FIG. 4 shows a measuring screen 200 arranged in front of the vehicle with regions illuminated by the light beams emitted by the light distributing units 20, 21 or 120, 121. The measuring screen 200 represents the traffic situation in front of the vehicle which is illuminated during a real utilization of the vehicle. The light distributing unit 20 or 120 which faces the counter traffic side or in other words during the right driving is arranged at the left side, illuminates a region identified with reference numeral 201. This region is arranged substantially only at the traffic side or in other words right of the center of the measuring screen 200. The region 201 is limited from above by a light-dark unit 202 which raises from the center of the measuring screen 200 to the outer edge of the traffic side or in other words to the right. The region 201 is limited at the counter traffic side or in other words to the left by a lateral bright-dark limit 202. The light beam emitted by the light distributing unit 20 or 120 thereby illuminate substantially only the traffic side.

The light distributing unit 21 or 121 which faces away the counter traffic side or in other words is arranged with the right traffic at the right side, illuminates a region identified with reference numeral 204 on the measuring screen 200. The region 204 extends both at the counter traffic side and also at the traffic side and is limited from above by substantially horizontal bright-dark limit 205. The raising bright-dark limit 202 of the region 201 extends from the horizontal bright-dark limit 205.

A horizontal movement of the light conducting elements 18 or 118 and/or the lens elements 26 or 126 by the adjusting device 30 or 130, is performed in the illuminating device in accordance with the third embodiment only for the light distributing unit 21 or 121 so as to illuminate both the traffic side and the counter traffic side. No horizontal movement of the light conducting elements and/or lens elements is performed in the other light distributing unit 20 or 120. It is however also possible in the third embodiment to perform with both light distributing units 20, 21 or 120, 121 the horizontal movement of the light conducting elements and/or the lens elements.

Figure 5:
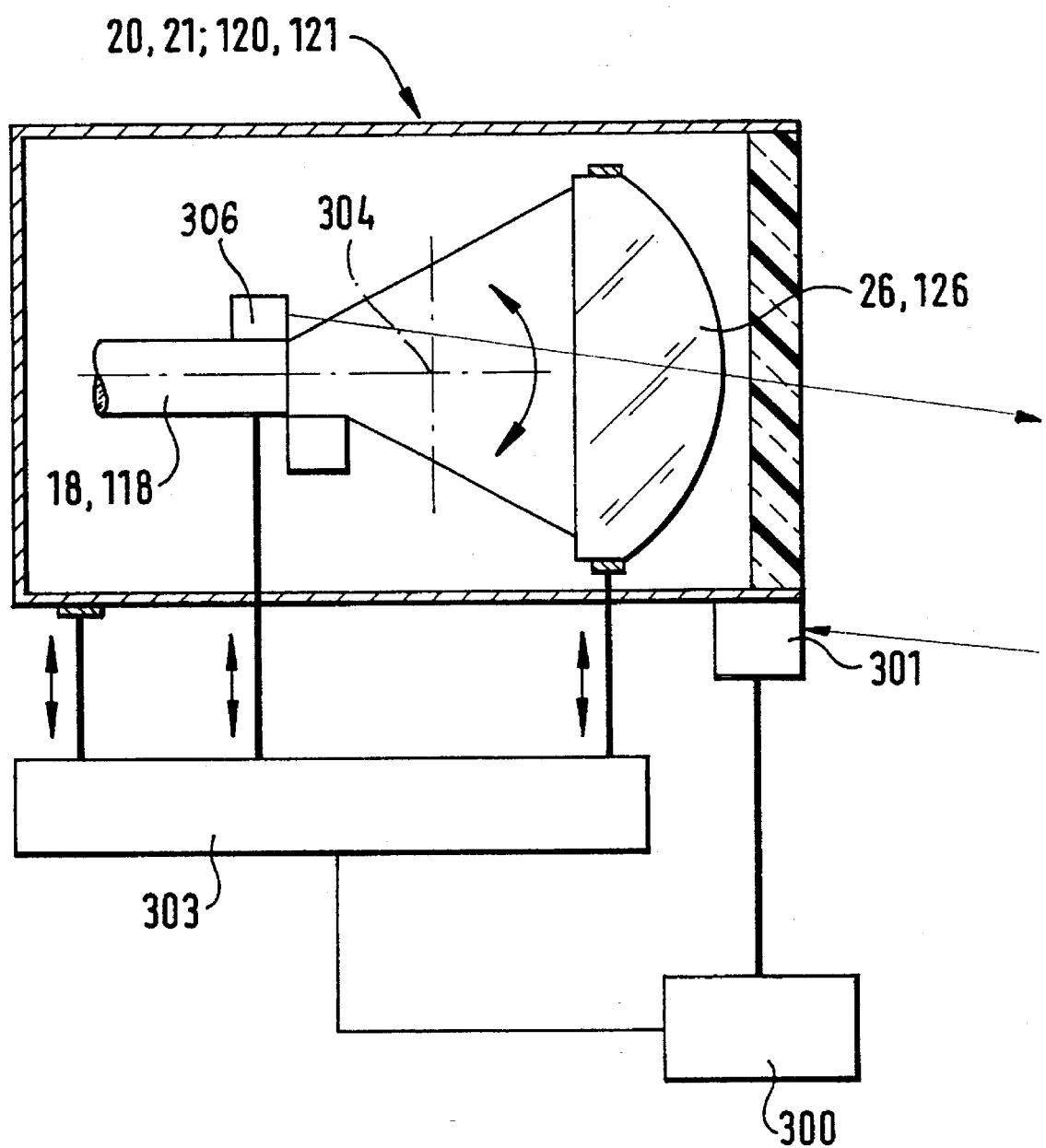
FIG. 5 is a view showing a fourth embodiment of the illuminating device of the invention in a vertical section taken along the line V—V in FIG. 2, with a light width regulating device associated with it.

In addition to the above described embodiments, the illuminating device shown in FIG. 5 which represents a fourth embodiment of the present invention has an arrangement for regulating the light width of the light beam exiting the light distributing units 20, 21 or 120, 121. This device can maintain the light width constant, independently from the inclination of the vehicle. The light width regulating device has an evaluating device 300 for detecting the vehicle inclination and a sensor device 301 connected with the evaluating device which for example senses the spring deflection of the vehicle. Moreover, the sensor device 301 can be optoelectronically operating and can detect either a part of the light exiting the light distributing unit and reflected from the roadway in front of the vehicle, or can detect an electromagnetic radiation emitted by a special transmitter 306 and reflected from the roadway. Depending on the distance of the region of the roadway which reflects the light from the vehicle, it impinges differently in the sensing device 301, and thereby in the evaluating device 300 the distance can be determined. The optoelectronic sensor device 301 can be provided with an imaging optics which can operate as a lens element 26 or 126 of the light distributing unit. With this lens element 26 or 126, no adjustment however is performed in a horizontal direction by the adjusting device 30 or 130. The evaluating device can also be connected with a further adjusting device 303. This adjusting device can adjust the light distributing units 20, 21 or 120, 121 for changing the light width. With the adjusting device 303 of the light width regulating device, the whole light distributing unit can be turned about a horizontal axis 304 or the light conducting elements 18 or 118 and/or the lens elements 26 and 126 can be moved vertically.

If the light distributing units 20, 21 or 120, 121 are formed as in the third embodiment for emitting different light beams, then in a simplified embodiment it is possible with the light distributing unit 21 or 121 which illuminates both the traffic side and the counter traffic side, to provide the light width regulating device since only by it a blinding of an oppositely coming vehicle driver can be caused.

It will be understood that each of the elements described above, or two or more together, may also find a useful application in other types of constructions differing from the types described above.

While the invention has been illustrated and described as embodied in an illuminating device for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An illuminating device for a vehicle, having at least one light generating unit; at least one light distributing unit arranged separately from said at least one light distributing unit; at least one light conducting element composed of light conducting fibers and connecting said units with one another, said light distributing unit being provided with at least one lens element for projecting and distributing light exiting from an end of said light conducting element associated with said light distributing unit, said units and said element being arranged so that a relative arrangement between said end of said light conducting element associated with said light distributing unit and also said lens element is changeable in a substantially horizontal direction for changing a distribution of light exiting said light conducting elements; and an adjusting device provided for changing said arrangement and activated by steering of the vehicle so that an illumination provided by said light distributing unit is increased in an actual driving direction.

2. An illuminating device as defined in claim 1, wherein said end of said light conducting element and said lens element are located relative to one another in a definite first arrangement during a straight driving of the vehicle, while during a steering actuation said end of said light conducting element and said lens element are moved by said adjusting device to a definite second arrangement.

3. An illuminating device as defined in claim 1, wherein said adjusting device is formed so that the change of the arrangement of said end of said light conducting element and said lens element is performed continuously with a steering actuation.

4. An illuminating device as defined in claim 1, wherein said light distributing unit has a plurality of light distributing subunits each provided with one said lens element and with an associated one said light conducting element, said adjusting device being formed so that the change of the arrangement between said light conducting element and said lens element is performed in different light distributing subunits to a different extent.

5. An illuminating device as defined in claim 1; and further comprising a control device which detects a steering action and is connected with said adjusting device so as to activate said adjusting device in dependence of the detection of the steering action.

6. An illuminating device as defined in claim 5, wherein said control device is formed so that said control device supplies additional informations about a driving speed of the vehicle and activates said adjusting device additionally in dependence on the driving speed.

7. An illuminating device for a vehicle, having at least one light generating unit; at least one light distributing unit; at least one light conducting element connecting said units with one another, said light distributing unit being provided with at least one lens element for projecting and distributing light exiting from an end of said light conducting element associated with said light distributing unit, said units and said element being arranged so that a relative arrangement between said end of said light conducting element associated with said light distributing unit and also said lens element is changeable in a substantially horizontal direction for changing a distribution of light exiting said light conducting elements; an adjusting device provided for changing said arrangement and activated by steering of the vehicle so that an illumination provided by said light distributing unit is increased in an actual driving direction; and a second such light distributing unit arranged so that said light distributing units are to be located at sides of the vehicle and correspondingly at a traffic side and a counter traffic side, said adjusting device being formed so that during driving over a curve oriented toward the counter traffic side, only in said light distributing unit which faces the counter traffic side said light conducting element is moved from its arrangement for a straight driving toward the traffic side, while during driving over the curve oriented toward the counter traffic side only in the light distributing unit facing the traffic side said light conducting element is moved from its arrangement for a straight driving toward the counter traffic side.

8. An illuminating device for a vehicle, having at least one light generating unit; at least one light distributing unit; at least one light conducting element connecting said units with one another, said light distributing unit being provided with at least one lens element for projecting and distributing light exiting from an end of said light conducting element associated with said light distributing unit, said units and said element being arranged so that a relative arrangement between said end of said light conducting element associated with said light distributing unit and also said lens element is changeable in a substantially horizontal direction for changing a distribution of light exiting said light conducting elements; an adjusting device provided for changing said arrangement and activated by steering of the vehicle so that an illumination provided by said light distributing unit is increased in an actual driving direction; and a second such light distributing unit arranged so that said light distributing units are to be arranged at sides of the vehicle and face a counter traffic side and a traffic side correspondingly, said adjusting device being formed so that during driving over a curve oriented toward the counter traffic side, only in the light distributing units facing the counter traffic side said lens element is moved from its arrangement for a straight driving toward the counter traffic side, while during driving over the curve oriented toward the traffic side only in the light distributing unit facing the traffic side said lens element is moved from its position for a straight driving toward the traffic side.

9. An illuminating device for a vehicle, having at least one light generating unit; at least one light distributing unit; at least one light conducting element connecting said units with one another, said light distributing unit being provided with at least one lens element for projecting and distributing light exiting from an end of said light conducting element associated with said light distributing unit, said units and said element being arranged so that a relative arrangement between said end of said light conducting element associated with said light distributing unit and also said lens element is changeable in a substantially horizontal direction for changing a distribution of light exiting said light conducting elements; and an adjusting device provided for changing said arrangement and activated by steering of the vehicle so that an illumination provided by said light distributing unit is increased in an actual driving direction, said adjusting device being activated additionally during an activation of a driving direction indicator of the vehicle so that an illumination provided by said light distributing unit is increased in a driving direction indicated by the driving direction indicator.

10. An illuminating device as defined in claim 9, wherein said adjusting device is formed so that said end of said light conducting element and said lens element is moved by said adjusting device from a first definite position with a non-actuated driving direction indicator to a second definite position during an actuation of the driving direction indicator.

11. An illuminating device for a vehicle, having at least one light generating unit; at least one light distributing unit; at least one light conducting element connecting said units with one another, said light distributing unit being provided with at least one lens element for projecting and distributing light exiting from an end of said light conducting element associated with said light distributing unit, said units and said element being arranged so that a relative arrangement between said end of said light conducting element associated with said light distributing unit and also said lens element is changeable in a substantially horizontal direction for changing a distribution of light exiting said light conducting elements; an adjusting device provided for changing said arrangement and activated by steering of the vehicle so that an illumination provided by said light distributing unit is increased in an actual driving direction; a device for regulating a light and associated with said light distributing unit, said device for regulating including an evaluating device for detecting a vehicle inclination and a sensor device provided for sensing a light width or a value representing said light width and connected with said evaluating device; and a further adjusting device connected with said device for regulating for adjusting said light distributing unit for changing said light width.

12. An illuminating device as defined in claim 11, wherein said further adjusting device is formed so as to change a relative arrangement between said light conducting element and said lens element in a vertical direction.

13. An illuminating device as defined in claim 11, wherein said further adjusting device is formed so that said light distributing unit is turnable about a horizontal axis.

14. An illuminating device as defined in claim 11; and further comprising a second such light distributing unit arranged so that one of said light distributing units illuminates a traffic side while another of said light distributing units illuminates both the traffic side and the counter traffic side, said device for regulating a light width being associated with said light distributing unit illuminating the counter traffic side.

* * * * *